United States Patent
Park et al.

(10) Patent No.: US 10,658,656 B2
(45) Date of Patent: May 19, 2020

(54) HIGH VOLTAGE POSITIVE ACTIVE MATERIAL AND METHOD FOR PREPARING THE SAME

(71) Applicant: LG Chem, Ltd., Seoul (KR)

(72) Inventors: Byung Chun Park, Daejeon (KR); Seong Hoon Kang, Daejeon (KR); Minsuk Kang, Daejeon (KR); Wang Mo Jung, Daejeon (KR); Ho Suk Shin, Daejeon (KR); Sang Min Park, Daejeon (KR); Geungi Min, Daejeon (KR)

(73) Assignee: LG Chem, Ltd. (KR)

( * ) Notice: Subject to any disclaimer, the term of this patent is extended or adjusted under 35 U.S.C. 154(b) by 221 days.

(21) Appl. No.: 14/551,269

(22) Filed: Nov. 24, 2014

(65) Prior Publication Data

US 2015/0079474 A1 Mar. 19, 2015

Related U.S. Application Data

(63) Continuation of application No. PCT/KR2013/005793, filed on Jul. 1, 2013.

(30) Foreign Application Priority Data

Jul. 9, 2012 (KR) .................. 10-2012-0074297

(51) Int. Cl.
| | |
|---|---|
| *H01M 4/505* | (2010.01) |
| *H01M 4/50* | (2010.01) |
| *H01M 4/525* | (2010.01) |
| *H01M 4/52* | (2010.01) |
| *H01M 4/36* | (2006.01) |
| *C01G 53/00* | (2006.01) |
| *H01M 4/62* | (2006.01) |
| *H01M 4/131* | (2010.01) |
| *H01M 4/04* | (2006.01) |
| *H01M 4/133* | (2010.01) |
| *H01M 4/587* | (2010.01) |
| *H01M 4/02* | (2006.01) |

(52) U.S. Cl.
CPC ............ *H01M 4/366* (2013.01); *C01G 53/54* (2013.01); *H01M 4/0416* (2013.01); *H01M 4/0471* (2013.01); *H01M 4/131* (2013.01); *H01M 4/133* (2013.01); *H01M 4/505* (2013.01); *H01M 4/525* (2013.01); *H01M 4/587* (2013.01); *H01M 4/625* (2013.01); *C01P 2006/40* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 5,789,114 A | 8/1998 | Adachi et al. | |
| 2009/0272939 A1 | 11/2009 | Sun et al. | |
| 2010/0181129 A1* | 7/2010 | Hamidi ................. | B60K 1/04 180/68.5 |
| 2011/0065000 A1* | 3/2011 | Chang ................... | H01M 4/131 429/212 |
| 2012/0328949 A1* | 12/2012 | Yamaguchi ......... | H01M 2/1686 429/224 |
| 2013/0236784 A1* | 9/2013 | Lin ......................... | H01M 4/62 429/212 |

FOREIGN PATENT DOCUMENTS

| | | | | |
|---|---|---|---|---|
| EP | 2325930 A1 | | 5/2011 | |
| JP | 2000/058040 | * | 2/2000 | ............ H01M 4/131 |
| JP | 2000-058040 A | | 2/2000 | |
| JP | 2013062089 A | | 4/2013 | |
| JP | 2013214355 A | | 10/2013 | |
| KR | 2006-0093842 A | | 8/2006 | |
| KR | 2010-0007236 A | | 1/2010 | |
| KR | 20100007236 | * | 1/2010 | ............ H01M 10/05 |
| TW | 201114095 A | | 4/2011 | |

OTHER PUBLICATIONS

English translation of KR20100007236 (2010).*
Li2Mn3NiO8 (LiMn1.5Ni0.5O4) Crystal Structure, Springer Materials (2018).*
English translation of JP 2000/058040 (Year: 2000).*
Oleic Acid (ScienceDirect) (Year: 2016).*
Carbohydrates (ScienceDirect) (Year: 2016).*
Naiqing Zhang, et al., "A facile method to prepare hybrid LiNi0.5O4/C with enhanced rate performance." Journal of Alloys and Compounds, 509 (2011) 3783-3786.
Tongyong Yang, et al., "Enhanced rate performance of carbon-coated LiNi0.5Mn1.5O4 cathode material for lithium ion batteries." Electrochimica Acta 56 (2011) 4058-4064.
Extended Search Report from European Application No. 13816719.2, dated Sep. 12, 2015.
Y. Lu, et al., "Enhanced rate performance of carbon nonotube-coated LiNi0.45 Al0.05Mn1.5O4 cathode material" Power and Energy Engineering Conference, 2012 Asia-Pacific, Mar. 29, 2012, XP055211203.
Huiqiao Li et al., "Enhancing the performance of Li-ion batteries by carbon-coating: present and future." Chemical Communications, 2012, vol. 48, pp. 1201-1217.

(Continued)

*Primary Examiner* — Yoshitoshi Takeuchi
(74) *Attorney, Agent, or Firm* — Lerner, David, Littenberg, Krumholz & Mentlik, LLP

(57) ABSTRACT

Disclosed herein is a high voltage cathode active material and a method for preparing the same. The cathode active material includes particles of a spinel-type compound having a composition represented by Formula (1) and a carbon-based material present on surfaces of the particles of the spinel-type compound:

$$Li_{1+a}M_xMn_{2-x}O_{4-z}A_z \tag{1}$$

where $-0.1 \leq a \leq 0.1$, $0.3 \leq x \leq 0.8$ and $0 \leq z \leq 0.1$.

10 Claims, No Drawings

(56) References Cited

OTHER PUBLICATIONS

Ahmed M. Hashem, et al., "Effect of carbon coating process of the structure and electrochemical performance of NiNi0.5Mn0.5O2 used as cathode in Li-ion batteries." Ionics, vol. 16, No. 4, Dec. 3, 2009.
International Search Report from PCT/KR2013/005793, dated Sep. 30, 2013.

* cited by examiner

HIGH VOLTAGE POSITIVE ACTIVE MATERIAL AND METHOD FOR PREPARING THE SAME

CROSS REFERENCE TO RELATED APPLICATIONS

The present application is a continuation of International Application No. PCT/KR2013/005793 filed Jul. 1, 2013, which claims the benefit of the filing date of Korean Patent Application No. 10-2012-0074297 filed Jul. 9, 2012, the disclosures of which are hereby incorporated herein by reference.

TECHNICAL FIELD

The present invention relates to a high voltage cathode active material and a method for preparing the same and, more particularly, to a cathode active material and a method for preparing the same, wherein the cathode active material includes particles of a spinel-type compound having a composition represented by Formula (1) and a carbon-based material present on surfaces of the particles of the spinel-type compound:

$$Li_{1+a}M_xMn_{2-x}O_{4-z}A_z \qquad (1)$$

where a, x, and z are defined as in the detailed description.

BACKGROUND ART

Along with major advances in Information Technology (IT), various mobile information communication devices have entered widespread use and the 21st century marks the dawn of a ubiquitous society in which high quality information services are available anywhere and anytime.

Lithium secondary batteries play an important role in the evolution of such a ubiquitous society.

As compared to other secondary batteries, lithium secondary batteries have high operating voltage and energy density and can be used for a long time, thus satisfying complex requirements for the needs of an increasing variety of complex devices.

Recently, many attempts have been made worldwide to develop existing lithium secondary battery technologies to extend their application not only to eco-friendly transport systems such as electric vehicles but also to power storage.

Secondary batteries used for middle or large-scale power sources such as electric vehicles or power storage systems (or energy storage systems (ESS)) require high power, high energy density and high energy efficiency. Despite advantages such as low price and high power, $LiMn_2O_4$ has a disadvantage in that the energy density thereof is lower than those of lithium cobalt oxides.

DISCLOSURE

Technical Problem

While developing a compound of $LiMn_2O_4$ in which manganese (Mn) is partially replaced by a metal such as nickel (Ni) to improve upon the low energy density of $LiMn_2O_4$ having an operating potential in the 4V range (from about 3.7V to about 4.5V), the present inventors discovered that, since the compound of $LiMn_2O_4$ with manganese being partially replaced by a metal such as nickel has a high operating potential of 4.6V or higher, the electrolyte decomposes even when the battery is in a normal operating range and performance thereof is reduced due to side reaction of the compound with the electrolyte. The present inventors also found that Mn ions suffer elution. $LiMn_2O_4$ having an operating potential in the 4V range does not suffer from this problem.

Therefore, the present invention has been made to solve the above problems and it is an object to provide a cathode active material for a high voltage in a 5V range and a method for preparing the same.

Technical Solution

In accordance with the present invention, the above and other objects can be accomplished by the provision of a cathode active material including particles of a spinel-type compound having a composition represented by Formula (1) and a carbon-based material present on surfaces of the particles of the spinel-type compound:

$$Li_{1+a}M_xMn_{2-x}O_{4-z}A_z \qquad (1)$$

where M is at least one selected from the group consisting of Ni, Ti, Co, Al, Cu, Fe, Mg, B, Cr, Zr, Zn and period II transition metals, A is a monoanion or dianion, and $-0.1 \leq a \leq 0.1$, $0.3 \leq x \leq 0.8$ and $0 \leq z \leq 0.1$.

The spinel-type compound of Formula (1) is different from $LiMn_2O_4$ in that the spinel-type compound of Formula (1) has an operating potential of equal to or higher than 4.6V and equal to or less than 4.9V whereas $LiMn_2O_4$ has an operating potential in the 4V range (from about 3.7V to about 4.3V). The spinel-type compound of Formula (1) exhibits high energy density characteristics as compared to $LiMn_2O_4$ since the spinel-type compound of Formula (1) has an operating potential of equal to or higher than 4.6V and equal to or less than 4.9V.

The carbon-based material may cover all or part of the surface of particles of the spinel-type compound. Specifically, the carbon-based material may cover equal to or greater than 20% and equal to or less than 100% of the entire surface of the particles of the spinel-type compound. In a non-limiting embodiment, the carbon-based material may cover equal to or greater than 50% and equal to or less than 80% of the entire surface of the particles of the spinel-type compound. Thus, elution of manganese is inhibited due to change in the surface energy of parts of the particles of the spinel-type compound covered with the carbon-based material.

The carbon-based material may serve as a protective layer to inhibit reaction with an electrolyte. The protective layer may block direct contact between the electrolyte and the compound of Formula (1) upon charge and discharge at high voltage to inhibit side reaction of the electrolyte. As a result, the cathode active material according to the present invention may exhibit stable charge/discharge cycle characteristics, thereby increasing reversible charge/discharge capacity.

In addition, since the carbon-based material has high electron conductivity, the carbon-based material reduces interfacial resistance of the spinel-type compound represented by Formula (1), thereby improving output (or power) characteristics.

In a non-limiting embodiment of the present invention, the compound of Formula (1) may comprise a compound represented by Formula (2):

$$Li_{1+a}Ni_bM_cMn_{2-(b+c)}O_{4-z}A_z \qquad (2)$$

where M is at least one selected from the group consisting of Ti, Co, Al, Cu, Fe, Mg, B, Cr, Zr, Zn and period II transition metals, A is a monoanion or dianion and is at least one selected from the group consisting of S, N and halogens such as F, Cl, Br, and I.

$-0.1 \leq a \leq 0.1$, $0.3 \leq b \leq 0.6$, $0 \leq c \leq 0.2$, and $0 \leq z \leq 0.1$.

The carbon-based material may be physically, chemically, or physico-chemically bonded to the surfaces of the particles of the spinel-type compound.

An average particle diameter (D50) of the carbon-based material may be equal to or greater than 2 nm and equal to or less than 500 nm Average particle diameters (D50) outside the above range are not preferred since it is not possible to effectively inhibit elution of manganese and side reaction with the electrolyte when the average particle diameter (D50) is less than 2 nm, and the carbon-based material may block the diffusion path of lithium ions, reducing high rate characteristics, when the average particle diameter (D50) is greater than 500 nm.

The cathode active material may be prepared through a liquid method in which a liquid coating solution is prepared and mixed with a cathode material, a mechano-chemical method using high mechanical energy of ball milling, a fluidized bed coating method, a spray drying method, a precipitation method in which a coating material is precipitated onto the surface of an active material in an aqueous solution, a method that utilizes reaction between a vapor coating material and a cathode material, a sputtering method and a mechanofusion method using static electricity.

In a specific example, the cathode active material may be prepared according to a method including mixing a spinel-type compound having a composition represented by the above Formula (1) and a carbon precursor, and thermally treating the mixture under an inert atmosphere or an oxygen deficient atmosphere with an oxygen concentration of 35% by volume or less.

In a specific example, the spinel-type compound and the carbon precursor may be mixed using dry mixing.

In a specific example, the heat treatment may be performed at a temperature of 400 to 800° C., the carbon precursor may include at least one selected from the group consisting of petroleum-based pitch, tar, phenolic resin, furan resin, and carbohydrate, and the inert atmosphere may be a nitrogen ($N_2$) or argon (Ar) atmosphere.

The cathode active material according to the present invention may be mixed with other lithium-containing transition metal oxides than those of the cathode active material described above.

Examples of the other lithium-containing transition metal oxides include, but are not limited to, layered compounds such as lithium cobalt oxide ($LiCoO_2$) and lithium nickel oxide ($LiNiO_2$) alone or substituted by one or more transition metals; lithium manganese oxides such as $Li_{1+y}Mn_{2-y}O_4$ (in which $0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by $LiNi_{1-y}M_yO_2$ (M=Co, Mn, Al, Cu, Fe, Mg, B or Ga and $0.01 \leq y \leq 0.3$); lithium manganese composite oxides represented by $LiMn_{2-y}M_yO_2$ (M=Co, Ni, Fe, Cr, Zn or Ta and $0.01 \leq y \leq 0.1$) or $Li_2Mn_3MO_8$ (M=Fe, Co, Ni, Cu or Zn); $LiMn_2O_4$ wherein Li is partially substituted by alkaline earth metal ions; disulfide compounds; and $Fe_2(MoO_4)_3$.

The cathode may be formed by adding the cathode mix including the cathode active material to a solvent such as NMP to prepare a slurry and applying the slurry to a cathode current collector, followed by drying and rolling.

The cathode mix may optionally include a conductive material, a binder, a filler, or the like in addition to the cathode active material.

The cathode current collector is generally manufactured to a thickness of 3 to 500 μm. Any cathode current collector may be used without particular limitation so long as high conductivity is provided without causing chemical changes in the battery. Examples of the cathode current collector include copper, stainless steel, aluminum, nickel, titanium, sintered carbon, copper or stainless steel surface-treated with carbon, nickel, titanium or silver, or an aluminum-cadmium alloy. The cathode current collector may include fine irregularities on the surface thereof so as to enhance bonding force to the cathode active material. In addition, the cathode current collector may be provided in various forms such as a film, a sheet, a foil, a net, a porous structure, a foam or a nonwoven fabric.

The conductive material is commonly added in an amount of 0.01 to 30% by weight, based on the total weight of the mixture including the cathode active material. Any conductive material may be used without particular limitation so long as suitable conductivity is provided without causing chemical changes in the battery. Examples of the conductive material include graphite such as natural or artificial graphite, carbon blacks such as acetylene black, Ketjen black, channel black, furnace black, lamp black and thermal black, conductive fibers such as carbon fibers and metallic fibers, metallic powders such as carbon fluoride, aluminum and nickel powders, conductive whiskers such as zinc oxide and potassium titanate whiskers, conductive metal oxides such as titanium oxide, and polyphenylene derivatives.

The binder is a component assisting in binding of an active material to a conductive material and a current collector. The binder is commonly added in an amount of 1 to 50% by weight, based on the total weight of the compound including the cathode active material. Examples of the binder include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers and various copolymers.

The filler is a component optionally used to inhibit expansion of the cathode. Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

Representative examples of the dispersion liquid that can be used in the present invention may include isopropyl alcohol, N-methyl pyrrolidone (NMP) and acetone.

Uniform application of paste as an electrode material to a metal material may be carried out using a conventional method or a new appropriate method, selected taking into consideration the characteristics of materials to be used. For example, the electrode paste may be distributed over the current collector and then homogeneously dispersed thereon using a doctor blade. Where appropriate, distribution and dispersion of the electrode paste may also be performed through a single process. Further, application of the electrode paste may be carried out by a method selected from die casting, comma coating, screen printing and the like. Alternatively, application of the electrode paste may be carried out by molding the paste on a separate substrate and then adhering the same to the current collector via pressing or lamination.

Drying of the paste applied to the metal plate is preferably carried out in a vacuum oven at 50 to 200° C. up to 1 day.

For example, the anode may be prepared by applying an anode active material to an anode current collector, followed by drying and pressing. Optionally, the anode may further include components such as a conductive material, a binder or a filler described above.

The anode current collector is generally manufactured to a thickness of 3 to 500 μm. Any anode current collector may be used without particular limitation so long as suitable conductivity is provided without causing chemical changes in the battery. Examples of the anode current collector include copper, stainless steel, aluminum, nickel, titanium, sintered carbon, copper or stainless steel surface-treated with carbon, nickel, titanium or silver, or an aluminum-cadmium alloy. Similar to the cathode current collector, the anode current collector may include fine irregularities on the surface thereof so as to enhance bonding force to the anode active material. In addition, the anode current collector may be provided in various forms such as a film, a sheet, a foil, a net, a porous structure, a foam and a nonwoven fabric.

Examples of the anode active material may include carbon such as non-graphitized carbon and graphitized carbon, metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, II and III elements of the Periodic Table or halogens; $0 \leq x \leq 1$, $1 \leq y \leq 3$, and $1 \leq z \leq 8$), a lithium metal, lithium alloys, silicon-based alloys, tin-based alloys, metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, conductive polymers such as polyacetylene, and Li—Co—Ni based materials.

The separator is interposed between the cathode and the anode. A thin insulating film having high ion permeability and mechanical strength is used as the separator. The separator typically has a pore diameter of 0.01 to 10 μm and a thickness of 5 to 300 μm. For example, an olefin-based polymer such as polypropylene, which is chemically resistant and hydrophobic, a sheet or nonwoven fabric made of polyethylene or glass fibers, or craft paper is used as the separator. Representative examples of commercially available products for the separator may include Celgard series such as Celgard$^R$ 2400 and 2300 (available from Hoechest Celanese Corp.), polypropylene separators (available from Ube Industries Ltd., or Pall RAI Corp.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

When a solid electrolyte such as a polymer electrolyte is used, the solid electrolyte may also serve as a separator.

The lithium salt-containing non-aqueous electrolyte includes a non-aqueous electrolyte and lithium. A non-aqueous electrolytic solution, an organic solid electrolyte, an inorganic solid electrolyte or the like may be used as the non-aqueous electrolyte.

Examples of the electrolytic solution include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include organic solid electrolytes such as polyethylene derivatives, polyethylene oxide derivatives, polypropylene oxide derivatives, phosphoric acid ester polymers, polyagitation lysine, polyester sulfide, polyvinyl alcohol, polyvinylidene fluoride, and polymers containing ionic dissociation groups.

Examples of the inorganic solid electrolyte include inorganic solid electrolytes such as nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenylborate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrroles, 2-methoxy ethanol, aluminum trichloride or the like may be added to the non-aqueous electrolyte. If necessary, in order to impart incombustibility, the non-aqueous electrolyte may further include a halogen-containing solvent such as carbon tetrachloride or ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The secondary battery according to the present invention is preferably used for battery cells serving as a power source for small-scale devices and is also preferably used as a unit cell of a middle or large-scale battery module including a plurality of battery cells.

The present invention also provides a battery pack including the battery module as a power source for middle or large-scale devices. Preferred examples of the middle or large-scale devices include, but are not limited to, electric vehicles (EVs) including hybrid electric vehicles (HEVs) and plug-in hybrid electric vehicles (PHEVs), and power storage devices.

BEST MODE

The present invention will now be further described through examples. However, it should be noted that the following examples are given only to exemplify the present invention and the scope of the invention is not limited thereto.

EXAMPLE 1

$LiNi_{0.5}Mn_{1.5}O_4$ and petroleum-based pitch were introduced in a weight ratio of 100:5 into a conical agitator and were then mixed at 400 rpm for 1 hour. Thereafter, the mixture was thermally treated for 20 hours at a temperature of 500° C. under a nitrogen atmosphere, thereby preparing LiNi$_{0.5}$Mm$_{1.5}$O$_4$ surface-modified with a carbon-based material.

LiNi$_{0.5}$Mn$_{1.5}$O$_4$ surface-modified with a carbon-based material, a conductive material and a binder were weighed in a ratio of 97:2.5:2.5 and then added to NMP, followed by mixing, to form a cathode mix. The cathode mix was applied to an aluminum foil with a thickness of 20 μm, followed by rolling and drying, to form a cathode for lithium secondary batteries.

A 2016 coin battery was then fabricated using the formed cathode for lithium secondary batteries, a lithium metal film as a counter electrode (i.e., an anode), a polyethylene membrane (Celgard, thickness: 20 μm) as a separator, and a liquid electrolyte including 1M LiPF$_6$ dissolved in a solvent in which ethylene carbonate, dimethylene carbonate and diethyl carbonate were mixed in a ratio of 1:2:1.

Comparative Example 1

A coin battery was fabricated in the same manner as in Example 1, except that LiNi$_{0.5}$Mm$_{1.5}$O$_4$, which was not surface-modified with a carbon-based material, was used as a cathode active material.

Experimental Example 1

Initial Charge/Discharge Characteristics

Coin batteries fabricated in Example 1 and Comparative Example 1 were charged and discharged once at a current of 0.1 C within a voltage range of 3.5 to 4.9 V and charge/discharge characteristics were estimated. Estimation results are shown in Table 1 below.

TABLE 1

| | Initial Charge Capacity (mAh/g) | Initial Charge Capacity (mAh/g) | Initial Charge/Discharge Efficiency (%) |
|---|---|---|---|
| Ex. 1 | 147.9 | 141.5 | 95.7 |
| Comp. Ex. 1 | 147.3 | 138.6 | 94.1 |

Experimental Example 2

Rapid Charging Characteristics

Coin batteries fabricated in Example 1 and Comparative Example 1 were charged and discharged at a current of 0.1 C and were then charged at a current of 5.0 C, and rapid charging characteristics were estimated. Estimation results are shown in Table 2 below.

TABLE 2

| | 0.1 C Charge Capacity (mAh/g) | 5 C Charge Capacity (mAh/g) | Rapid charging Efficiency 0.1 C/5.0 C (%) |
|---|---|---|---|
| Ex. 1 | 147.9 | 135.8 | 91.8 |
| Comp. Ex. 1 | 147.3 | 125.6 | 85.3 |

Experimental Example 3

Service Life Characteristics

Coin batteries fabricated in Example 1 and Comparative Example 1 were charged and discharged 100 times at a current of 1.0 C and service life characteristics were estimated. Estimation results are shown in Table 3 below.

TABLE 3

| | Service life Characteristics 100$^{th}$/1$^{st}$ Discharge Capacity (%) |
|---|---|
| Ex. 1 | 95.9 |
| Comp. Ex. 1 | 91.8 |

Experimental Example 4

Eluted Manganese Amount Measurement

Coin batteries fabricated in Example 1 and Comparative Example 1 were charged and discharged once at a current of 0.1 C within a voltage range of 3.5 to 4.9 V and were charged at a current of 0.1 C to 4.9 V. The batteries were then disassembled. A cathode obtained from each of the disassembled batteries was dipped in a container containing 15 mL of an electrolyte and was stored in an 80° C. constant temperature bath for 2 weeks. Then, the content of manganese eluted into the electrolyte was analyzed using an ICP (PerkinElmer, Model 7100).

TABLE 4

| | Amount of Eluted Manganese (ppm) |
|---|---|
| Ex. 1 | 76 |
| Comp. Ex. 1 | 280 |

Experimental Example 5

High Temperature Storage Characteristics Estimation

Coin batteries fabricated in Example 1 and Comparative Example 1 were charged and discharged once at a current of 0.1 C within a voltage range of 3.5 to 4.9 V and were charged at a current of 0.1 C to 4.9 V. The batteries were then stored in a 60° C. constant temperature bath for 1 week and the amount of self-discharge and the capacity recovery rate of each of the batteries were measured. When a battery is stored in a fully charged state at high temperature, decomposition of electrolyte on the surface of a cathode active material is accelerated, increasing self-discharge. This causes destruction of the structure of the cathode active material. This experiment was devised to observe this phenomenon.

TABLE 5

| | Amount of Self-Discharge (%) | Capacity Recovery Rate (%) |
|---|---|---|
| Ex. 1 | 24 | 88 |
| Comp. Ex. 1 | 62 | 45 |

INDUSTRIAL APPLICABILITY

According to the present invention, all or part of the surface of particles of a spinel-type compound of the above Formula 1 are coated with a carbon-based material. This inhibits elution of manganese and electrolyte side reaction at a high voltage, thereby enabling provision of improved high-voltage lithium secondary batteries.

The invention claimed is:

1. A cathode active material comprising:
   particles of a spinel-type compound having a composition represented by Formula (2);
   wherein the particles of the spinel-type compound has a material present on surfaces of the particles of the spinel-type compound, wherein the material consists of particles consisting of a carbon-based material:

$$Li_{1+a}Ni_bM_cMn_{2-(b+c)}O_{4-z}A_z \quad (2)$$

where M is at least one selected from the group consisting of Ti, Co, Al, Cu, Fe, Mg, B, Cr, Zr, Zn and period II transition metals,
A is a monoanion or dianion, and
$-0.1 \leq a \leq 0.1$, $0.3 \leq b \leq 0.6$, $0 \leq c \leq 0.2$, and $0 \leq z \leq 0.1$,
wherein the carbon-based material is physically and/or chemically bonded to the surfaces of the particles of the spinel-type compound of Formula (2),
wherein an average particle diameter (D50) of the carbon-based material is equal to or greater than 2 nm and equal to or less than 500 nm, and
the cathode active material is prepared by mixing the spinel-type compound of Formula (2) and a carbon precursor to form a resulting mixture, wherein the carbon precursor and the spinel-type compound are mixed using dry mixing, wherein the carbon precursor is petroleum-based pitch; and
thermally treating the resulting mixture at a temperature of 400 to 800° C. under an inert atmosphere or an oxygen deficient atmosphere with an oxygen concentration of 35% by volume or less.

2. The cathode active material according to claim 1, wherein the carbon-based material covers equal to or greater than 20% and equal to or less than 100% of the entire surface of the spinel-type compound of Formula (2).

3. The cathode active material according to claim 2, wherein the carbon-based material covers equal to or greater than 50% and equal to or less than 80% of the entire surface of the spinel-type compound of Formula (2).

4. A lithium secondary battery comprising the cathode active material according to claim 1.

5. A battery pack comprising the lithium secondary battery according to claim 4.

6. An electric vehicle comprising the battery pack according to claim 5.

7. A method for preparing the cathode active material of claim 1, the method comprising:
   (1) mixing a spinel-type compound having a composition represented by Formula (2) and a carbon precursor,
   wherein the carbon precursor and the spinel-type compound are mixed using dry mixing, wherein the carbon precursor is petroleum-based pitch;
   (2) thermally treating the resulting mixture under an inert atmosphere or an oxygen deficient atmosphere with an oxygen concentration of 35% by volume or less:

$$Li_{1+a}Ni_bM_cMn_{2-(b+c)}O_{4-z}A_z \quad (2)$$

where M is at least one selected from the group consisting of Ti, Co, Al, Cu, Fe, Mg, B, Cr, Zr, Zn and period II transition metals,
A is a monoanion or dianion, and
$-0.1 \leq a \leq 0.1$, $0.3 \leq b \leq 0.6$, $0 \leq c \leq 0.2$, and $0 \leq z \leq 0.1$,
   (3) resulting in the cathode active material of claim 1.

8. The method according to claim 7, wherein the thermal treatment is performed at a temperature of 400 to 800° C.

9. The method according to claim 7, wherein the carbon precursor comprises at least one selected from the group consisting of petroleum-based pitch, tar, phenolic resin, furan resin and carbohydrate.

10. The method according to claim 7, wherein the inert atmosphere is a nitrogen ($N_2$) or argon (Ar) atmosphere.

* * * * *